(12) United States Patent
Patenaude

(10) Patent No.: US 11,029,471 B2
(45) Date of Patent: Jun. 8, 2021

(54) OPTICAL CONNECTOR AND CONTACTING ELEMENT FOR AN OPTICAL CONNECTOR

(71) Applicant: INTERLEMO HOLDING S.A., Ecublens (CH)

(72) Inventor: Alexandre Patenaude, Thonon-les-Bains (FR)

(73) Assignee: INTERLEMO HOLDING S.A., Ecublens (CH)

( * ) Notice: Subject to any disclaimer, the term of this patent is extended or adjusted under 35 U.S.C. 154(b) by 326 days.

(21) Appl. No.: 16/093,475

(22) PCT Filed: Apr. 10, 2017

(86) PCT No.: PCT/EP2017/058587
§ 371 (c)(1),
(2) Date: Oct. 12, 2018

(87) PCT Pub. No.: WO2017/178445
PCT Pub. Date: Oct. 19, 2017

(65) Prior Publication Data
US 2020/0326488 A1    Oct. 15, 2020

(30) Foreign Application Priority Data

Apr. 14, 2016    (FR) .................................. 1653311

(51) Int. Cl.
*G02B 6/38*    (2006.01)
(52) U.S. Cl.
CPC ......... *G02B 6/3874* (2013.01); *G02B 6/3817* (2013.01); *G02B 6/3869* (2013.01)

(58) Field of Classification Search
None
See application file for complete search history.

(56) References Cited

U.S. PATENT DOCUMENTS

| | | | | |
|---|---|---|---|---|
| 4,747,658 A | * | 5/1988 | Borsuk | G02B 6/3835 385/78 |
| 5,283,848 A | * | 2/1994 | Abendschein | G02B 6/3878 385/59 |
| 5,446,817 A | * | 8/1995 | Kardos | G02B 6/3825 385/72 |
| 5,608,828 A | | 3/1997 | Coutts | |
| 6,305,849 B1 | * | 10/2001 | Roehrs | B41J 2/175 385/59 |

(Continued)

FOREIGN PATENT DOCUMENTS

| | | |
|---|---|---|
| EP | 1074867 | 2/2001 |
| EP | 1251374 | 10/2002 |

OTHER PUBLICATIONS

International Search Report issued by the International Searching Authority, dated Jul. 17, 2017, for International Patent Application No. PCT/EP2017/058587; 14 pages.

*Primary Examiner* — Michael Stahl
(74) *Attorney, Agent, or Firm* — Faegre Drinker Biddle & Reath LLP

(57) ABSTRACT

The invention relates to a contacting element (1) for an optical fibre connector, said contacting element being made up of a front part (2), in which a ferrule (4) is accommodated and secured, and a rear part (3), in which a spring (5) is accommodated, said rear part being shaped to permit the through-passage of an optical fibre.

8 Claims, 5 Drawing Sheets

(56) References Cited

U.S. PATENT DOCUMENTS

| | | | |
|---|---|---|---|
| 6,352,373 B1* | 3/2002 | Yamaguchi | G02B 6/3869 385/60 |
| 2003/0095780 A1* | 5/2003 | Chang | G02B 6/266 385/140 |
| 2016/0018602 A1 | 1/2016 | Govari | |

* cited by examiner

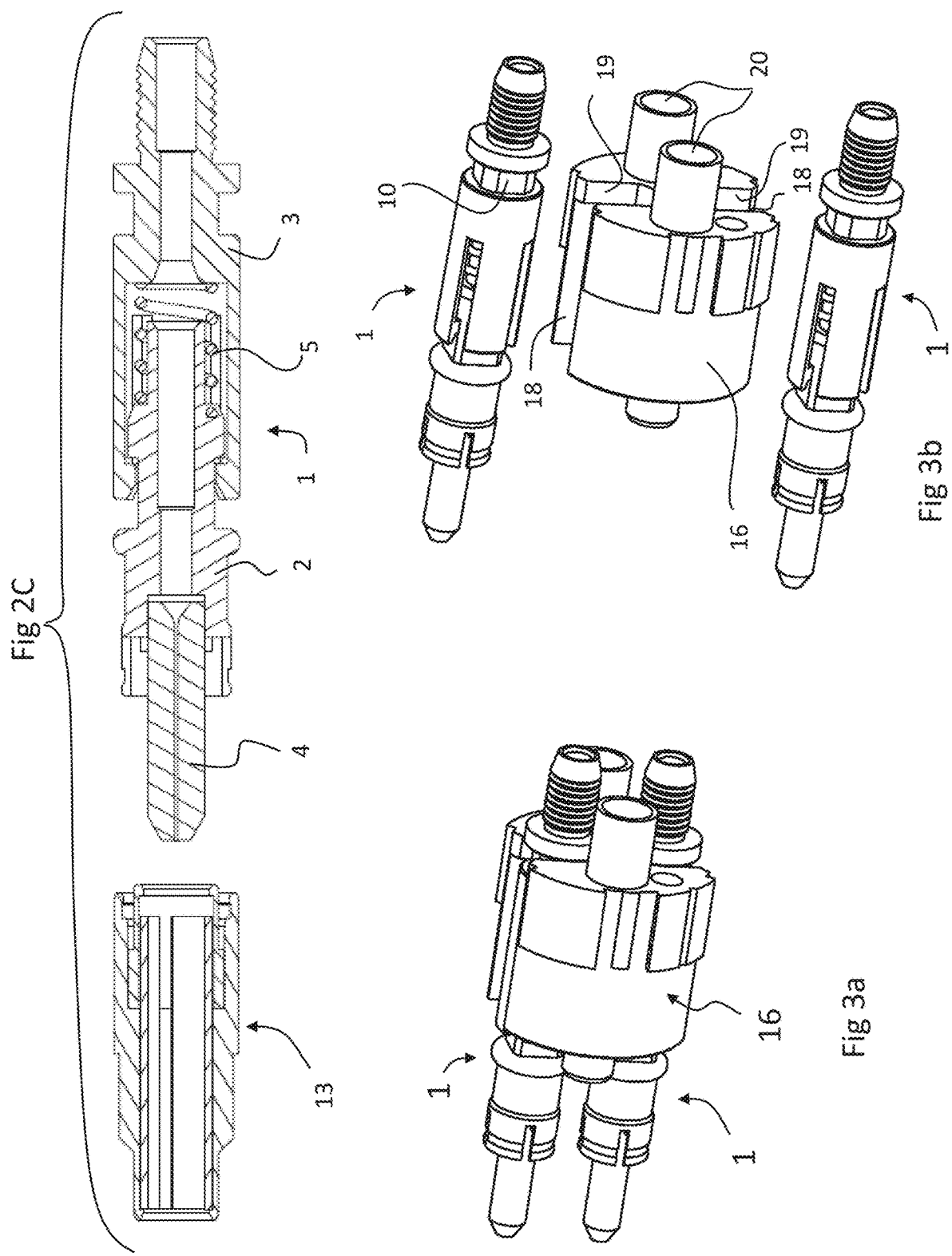

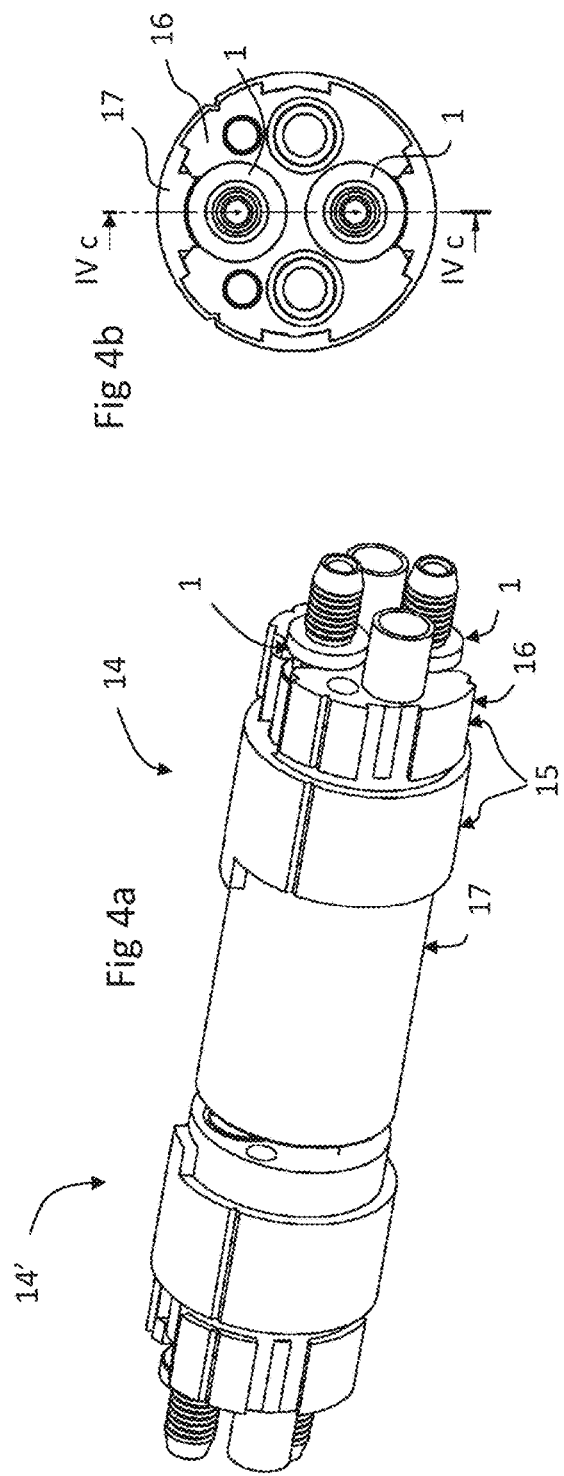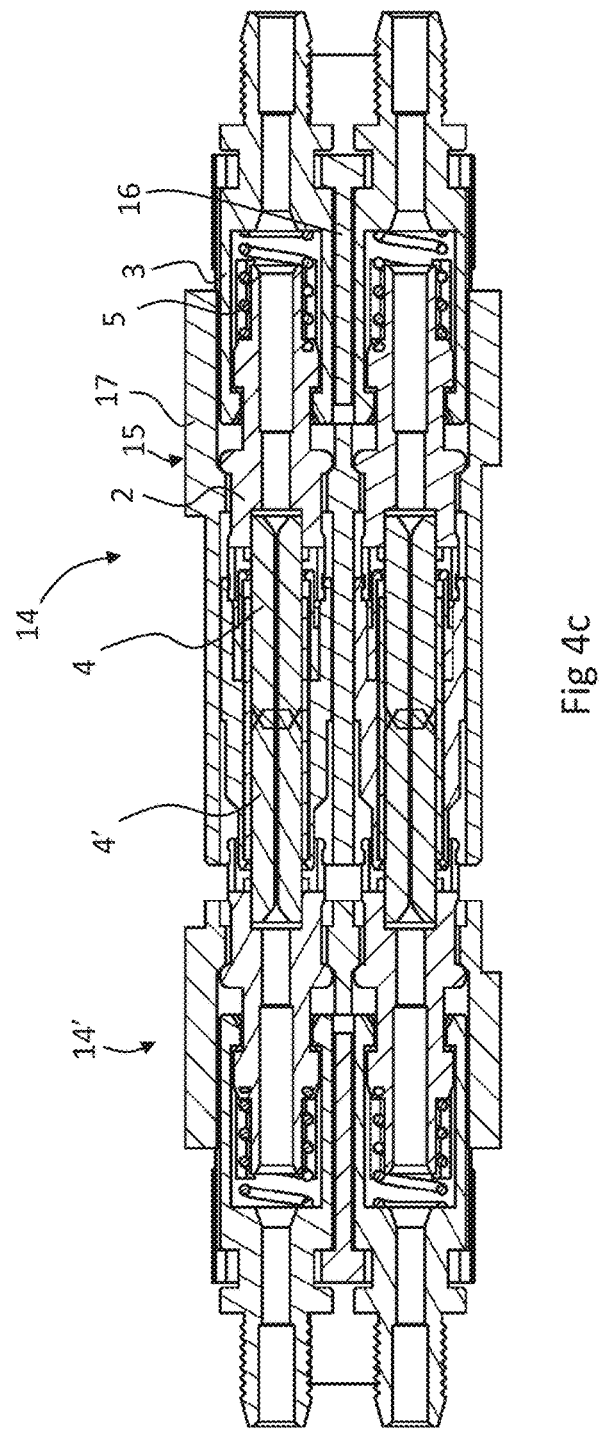

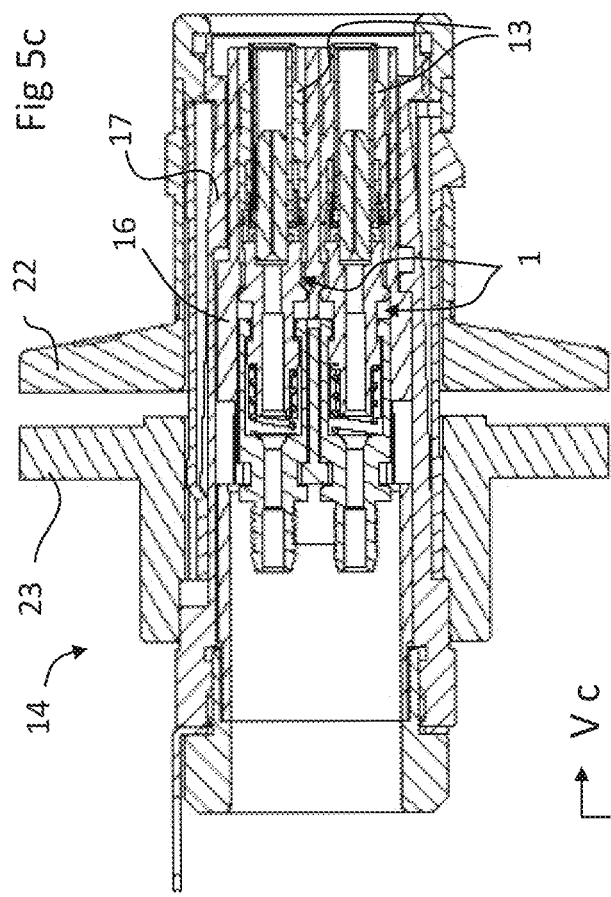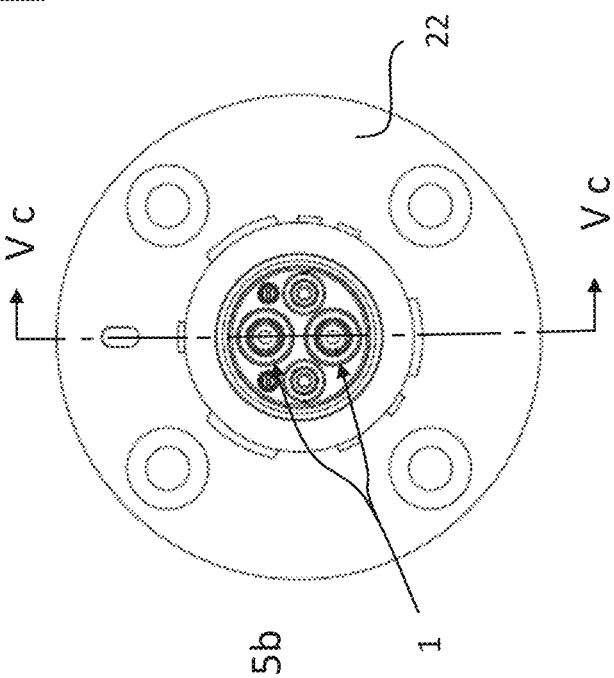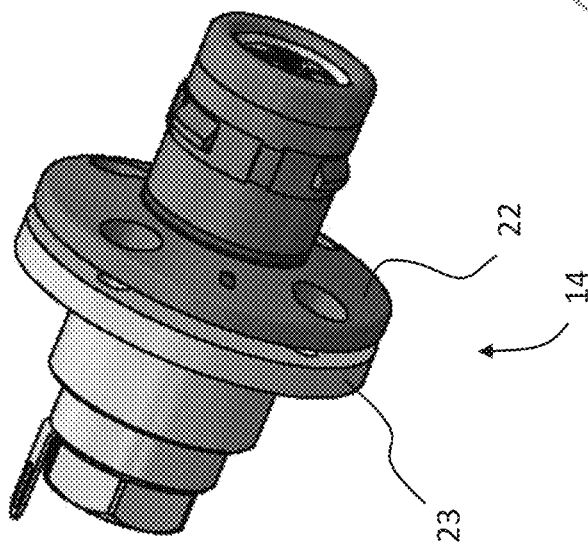

OPTICAL CONNECTOR AND CONTACTING ELEMENT FOR AN OPTICAL CONNECTOR

This application claims priority to PCT Application Number PCT/EP2017/058587 filed Apr. 10, 2017, which in turn claims priority from French Patent Application Number 1653311 filed Apr. 14, 2016, the subject matter of which are incorporated herein by reference.

TECHNICAL FIELD OF THE INVENTION

The present invention relates to the field of fiber optic connectors. The invention relates particularly to a contacting element for a fiber optic connector.

PRIOR ART

A ferrule connector for fiber optics generally comprises a base and a plug containing one or more contacting elements, also called optical contacts in technical jargon. Each contacting element comprises a ferrule within which a stripped portion of an optical fiber can be inserted. However, during assembly of the base and of the plug of a ferrule connector, it is important that the ferrule(s) carried by the contacting element(s) disposed in the base of the connector are perfectly aligned with the ferrules carried by the contacting elements disposed in the plug of the connector.

To ensure optimal alignment, an alignment device, or alignment tube, is generally used, which appears in the form of a tube, hollow at each of its ends at least, and having an internal surface with an appropriate shape so that the ends of the alignment tube can be coupled with the ends of the contacting elements. Thus, during assembly of the plug and of the base of a fiber optic connector, an alignment tube is coupled with each contacting element of a portion of the connector, the base or the plug, in order, at the moment of assembly of the plug with the base, to couple with the contacting element(s) of the other portion of the connector and thus ensure optimal alignment of the ferrules of the base with the ferrules of the plug.

To be able to couple an alignment tube with a contacting element, the contacting elements used in fiber optic connectors are generally provided with a sheath, sometimes made of plastic, of which one end is adapted to cooperate with the internal surface of one end of an alignment tube. The sheath is disposed to surround the ferrule of the contacting element by generally being made integral with the contacting element by hot gluing.

However, the construction and assembly of such contacting elements provided with a sheath made of plastic involves significant production and assembly costs.

DISCLOSURE OF THE INVENTION

The invention aims to mitigate these disadvantages. In particular, the invention has as its objective to supply a contacting element for a fiber optic connector which, while still permitting the alignment of the ferrules to be ensured at the moment of assembly of the base and of the plug of the connector, is less costly to produce and to assemble.

The invention also aims to simplify the method of assembly of a fiber optic connector, particularly of the contacting element with an optical fiber.

The aims of the invention are attained by a contacting element for a fiber optic connector according to claim 1 and by a connector for optical fibers according to claim 7.

In the present application, a contacting element is described for a fiber optic connector, comprising a front part, within which a ferrule is lodged and fixed, a rear part, within which a spring is lodged, and an alignment tube. The rear part is formed to allow the through-passage of an optical fiber. The front part is movably fixed to the rear part, the front part being formed to be inserted at least partially within the rear part so that the spring pushes the front part and the rear part in opposite directions. The front part is provided with a locking portion formed so as to allow coupling in a fixed but separable position with an end of the alignment tube.

In an embodiment, the locking portion comprises a groove or protuberance extending on the circumference of said front part, interrupted by at least one longitudinal slot so as to confer a certain elasticity to the locking portion.

In an embodiment, the groove is adjacent to a lip protruding with respect to said groove.

In an embodiment, the rear part has a recess, the bottom of said recess having at least one anti-rotation surface.

In an embodiment, the front part is at least partially inserted into the rear part, the spring being disposed in the interior of the rear part in compression against a rear end of the front part.

In an embodiment, the rear part comprises at least one claw which cooperates with a gripping shoulder formed in the front part to hold the front part integral with the rear part.

In the present application is also described a fiber optic connector comprising a housing and at least one contacting element mounted in the housing.

In an embodiment, the connector can also comprise one or more electrical terminals.

In an embodiment, the connector comprises a plurality of said contacting elements.

In an embodiment, the housing comprises a body supporting a plurality of said contacting elements and said electrical terminals, if present, and a shell assembled to the body.

In an embodiment, the housing comprises a support body comprising lodging cavities supporting and positioning the contacting elements in the housing. Each lodging cavity comprises a lateral slot allowing lateral insertion of each contacting element into its respective lodging cavity.

The lateral slot can be supplied with an anti-rotation guide cooperating with an anti-rotation surface of the contacting element in order to block the rotation thereof when it is inserted into the support body.

In an embodiment, the support body can comprise a rail which is inserted into a recess of the rear part to block the axial position of the rear part with respect to the housing.

Other features and advantages of the invention will be revealed upon reading the description that follows, with reference to the appended figures.

BRIEF DESCRIPTION OF THE FIGURES

FIG. 2C is a section view of the contacting element and of the alignment tube illustrated in FIG. 2A;

FIG. 3A is a perspective view of contacting elements assembled into a support body of a housing of an optical connector according to an embodiment of the invention;

FIG. 3B is a view similar to FIG. 3A prior to assembly of the contacting elements into the support body;

FIG. 4A is a perspective view of an optical connector according to an embodiment of the invention, coupled to a complementary optical connector;

FIG. 4B is a view of an axial end of the connector of FIG. 4A;

FIG. 4C is a section view along line IVc-IVc of FIG. 4B;

FIG. 5A is a perspective view of an optical connector according to another embodiment of the invention;

FIG. 5B is a view of an axial end of the connector of FIG. 5A;

FIG. 5C is a section view along line Vc-Vc of FIG. 5B.

DETAILED DESCRIPTION OF THE INVENTION

Figure 1:
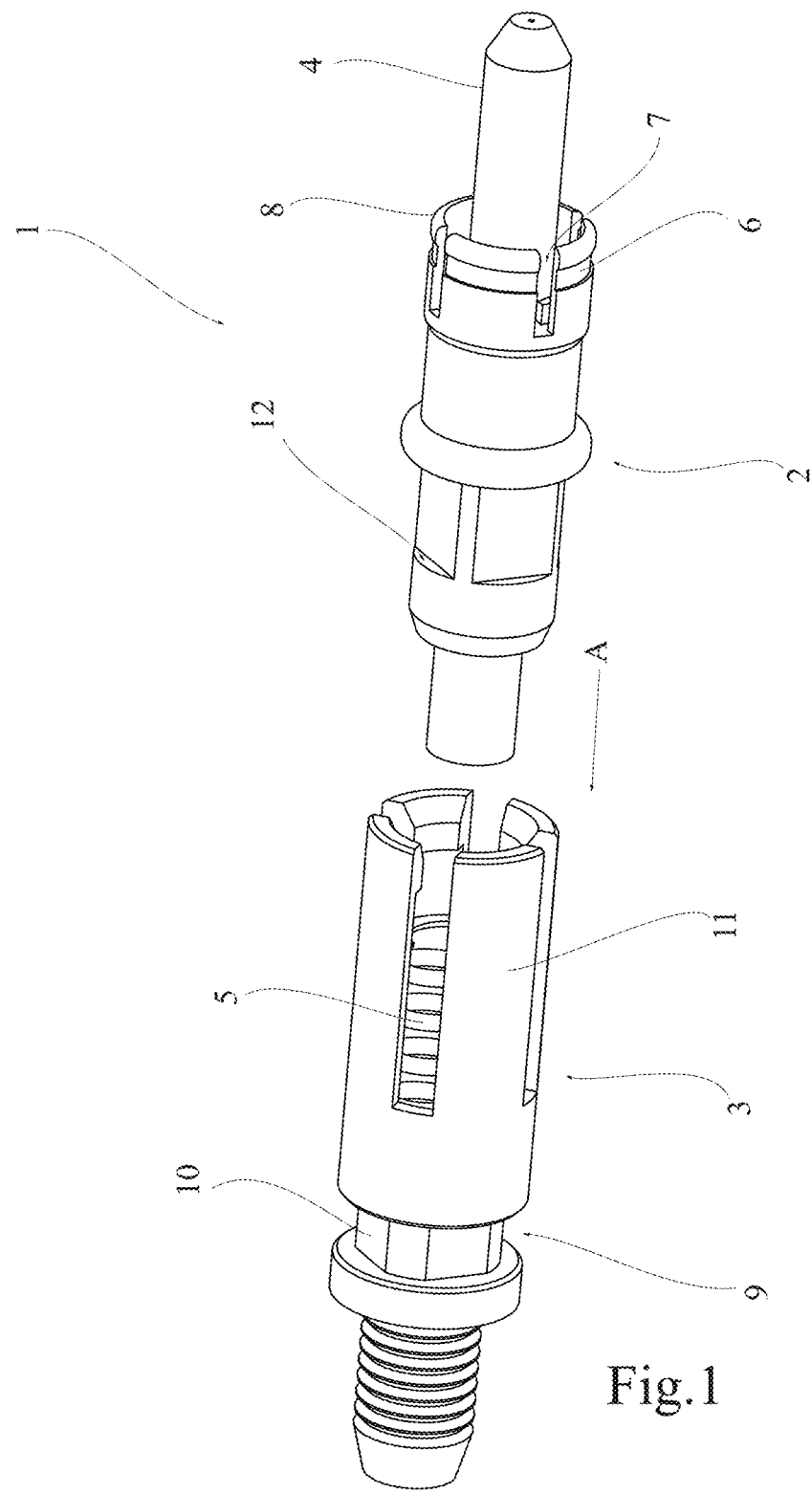
FIG. 1 is a perspective view, partially exploded, of a contacting element according to the invention.

Referring to the figures, a contacting element 1 for a ferrule connector for optical fibers according to an embodiment of the invention is adapted to be used within a connector 14, 14' for optical fibers, whether the connector is a base (female connector) or a plug (male connector).

The contacting element 1 comprises a front part 2 and a rear part 3. Although shown separately from the rear part 3 in FIG. 1, a person skilled in the art will understand that the front part 2 of the contacting element 1 is inserted, by moving in the direction of the arrow A, within the rear part 3 to be fixed there by connection means as described below. As a person skilled in the art will perceive, the contacting element according to the invention is adapted so that an optical fiber can be inserted into it within the rear part 3 and that a stripped portion of the fiber is positioned within the ferrule 4.

Within the front part 2 of the contacting element 1 is lodged a ferrule 4. The ferrule 4 protrudes with respect to the front end of the front part 2 of the contacting element 1. The front end of the front part 2 comprises a locking portion 6, 7, 8. In the embodiment illustrated, the locking portion is configured for connection by elastic deformation with an alignment tube 13. In an embodiment, the locking portion comprises at least one groove 6 which extends on the circumference of the front part 2. The groove 6 is interrupted by at least one longitudinal slot 7 and is adjacent to a lip 8 which protrudes with respect to the groove 6. Alternatively, in an variant, the locking portion comprises at least one protuberance which extends on the circumference of the front part 2, the protuberance being interrupted by at least one longitudinal slot 7.

The groove 6, or the longitudinal slots 7 and the lip 8, are formed to allow the elastic coupling of the front part 2 with an end of an alignment tube 13. To this end, the alignment tube 13 has a hollow end of which the internal surface has a shape conjugated to the locking portion 6, 8, namely the shape of the assembly comprising the groove 6 and the lip 8 in the example illustrated. Thus, once inserted into the alignment tube, the front part 2 remains fixed there as long as a force attempting to separate the front part from the alignment tube is not applied. The insertion of the front part 2 within an alignment tube is also facilitated by the presence of the longitudinal slot(s) 7 which confer an elastic flexibility to the front end of the front part 2 so as to permit a slight deformation which facilitates coupling and decoupling the front part 2 with the alignment tube.

According to an alternative embodiment, the groove 6 can be replaced by one or more protuberances disposed or extending on the circumference of the front part 2. Although FIG. 1 shows three longitudinal slots 7, the front part 2 can comprise more than three or fewer than three longitudinal slots.

Furthermore, the rear end of the front part 2 has at least one gripping shoulder 12 which is adapted to cooperate with elements of the rear part 3 of the contacting element to attach together the front part 2 and the rear part 3 when, in normal use configuration, the rear end of the front part 2 is partially inserted within the rear part 3. Although FIG. 1 shows two gripping shoulders 12, the rear end of the front part can comprise more or fewer than two gripping shoulders 12.

Within the rear part 3 is lodged a spring 5 which is compressed when the front part 2 is inserted within the rear part 3, the front part 2 and the rear part 3 being movable with respect to each other against the bias of the spring. To attach the front part 2 to the rear part 3, the rear part comprises at least one claw 11 adapted to move away during the insertion of the front part into the rear part, and to block itself against the gripping shoulder 12 of the front part 2 under the thrust of the spring.

Figure 2A:
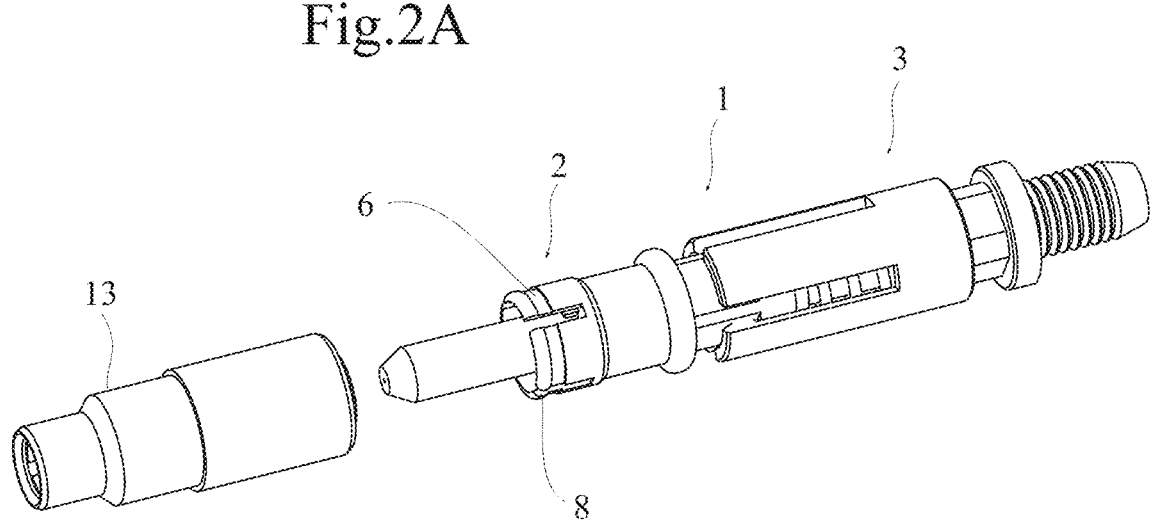
FIG. 2A is a perspective view of a contacting element and of an alignment tube prior to coupling, according to an embodiment of the invention.
Figure 2B:
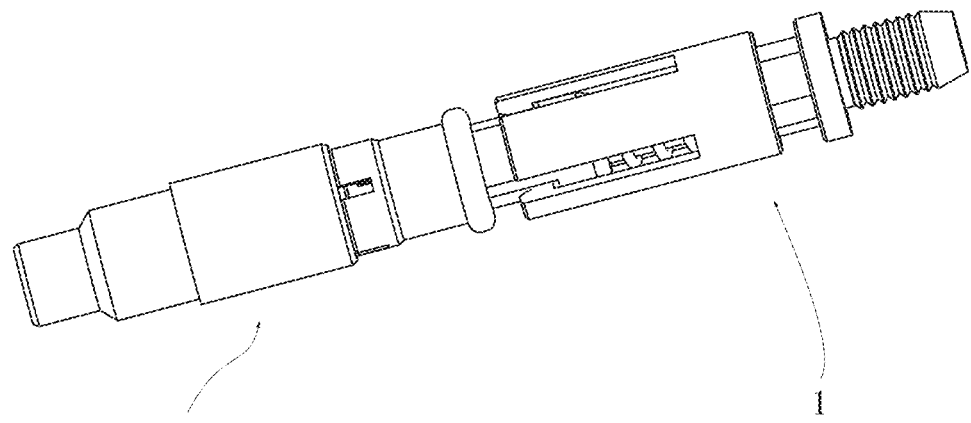
FIG. 2B, a perspective view of a coupled contacting element and alignment according to an embodiment of the invention.

FIGS. 2A, 2B and 2C show steps in a method coupling the contacting element 1 according to the invention with an alignment tube. In FIG. 2A, the contacting element 1 and the alignment tube are in position, ready to be coupled. In FIG. 2B, the alignment tube is coupled with the front end of the front part of the contacting element 1.

In addition, the rear end of the rear part 3 has a recess 9 having an anti-rotation shape, for example where the bottom has at least one flat surface 10. Thus, the contacting element according to the invention, when it is inserted within a housing of a connector formed to have a protuberance conjugated with the recess 9, can therefore be retained within the housing both in translation, by means of the recess 9, and in rotation, by means of the flat surface 10 or other anti-rotation shape.

The contacting element 1 according to the invention is therefore arranged to enable coupling with an alignment tube. In addition, the contacting element according to the invention consists of a minimal number of parts, in particular four parts which comprise the front part, the ferrule, the spring and the rear part.

Referring to FIGS. 3a to 5c, a connector 14 comprises a housing 15, the alignment tube 13, and one or more contacting elements 1. In the example illustrated, the connector 14 comprises two contacting elements 1 to couple two optical fibers to a complementary connector 14'. The connector 14 can also comprise other connection elements, in particular electrical terminals, so as to constitute a hybrid connector permitting optical and electric connections to be performed for the transmission of optical signals and electrical power, or for the transmission of electrical signals. The connector can of course comprise only one, or more than two contacting elements depending on the application and the number of optical fibers to be connected.

The housing 15 comprises a support body 16 and a shell 17 in which the support body is mounted. In the example illustrated, the housing is therefore formed of two assembled portions, but in variants the housing can also be formed from a single piece or from more than two assembled pieces. The portions of the housing can be can be made of dielectric material or of metal depending on the applications, so long as there are insulating inserts to support the electrical terminals (if they are present).

The support body is adapted to support and position the contacting elements 1 and comprises lateral slots permitting lateral insertion of the contacting elements 1 into the lodging cavities 18, as illustrated in FIGS. 3a and 3b. Anti-rotation guides 19, for example in the form of rails, cooperate with the flat surfaces 10 or other anti-rotation surfaces of the contactors so as to block the rotation thereof when they are inserted into the support body 16. The axial ends of the recess 9 inserted between the rails of the anti-rotation guide 19 thus permit blocking the axial position of the rear part 3 of the contacting element 1 with respect to the support body 16 and therefore to the housing 15.

When the contacting elements are assembled in the housing 15, the front part 2 of the contacting element can be displaced axially against the force of the spring 5. As the alignment tube 13 is locked to the front part 2 of the contacting element when the connector 14 is coupled to a complementary connector 14', the ferrule 4 with the alignment tube 13 and the front part are displaced with respect to the housing 15 to absorb axial clearance and to ensure positive contact of the end of the ferrule and of the optical fiber with the ferrule and the optical fiber of the complementary connector 14'.

The connectors 14, 14' are provided with locking elements disposed on their respective housings for locking the connectors together when they are coupled.

Referring to FIGS. 5a to 5b, the connector 14 can be configured for mounting on a panel or other structure, the connector comprising flanges 22, 23 fixed to the housing 15 or forming an integral part of the housing 15. One of the flanges can be equipped with threads cooperating with threads on the housing of the connector allowing it to be clamped against a panel element sandwiched between the two flanges 22, 23. The elements of the flanges 22, 23 can take different forms and allow different means of connection to a device structure in which the connector is mounted.

Advantageously, the assembly of the alignment tube 13 with the front part 2 of a contacting element 1 to which the ferrule (4) is fixed, combined with the coupling by spring 5 between the front 2 and rear 3 parts of the contacting element, permit supplying a contacting element and a connector optical fibers which is economical to manufacture and assemble, while offering a reliable, sure and accurate connection between optical fibers. The possibility of inserting laterally the optical contactors 1 into a support body 16 also facilitates the assembly of optical fibers into the contactors and then into a connector housing in an economical and robust manner.

LIST OF REFERENCES connector 14
  housing 15
    support body 16
      lodging cavity 18 for contactor
        anti-rotation guide 19
      lodging cavity 20 for electrical terminal
    shell 17
    flanges 22, 23
contacting element 1
  front part 2
    ferrule 4
    locking portion (elastic) 6, 7, 8
      groove (or protuberance) 6
      longitudinal slots 7
      lip 8
    gripping shoulders 12

-continued rear part 3
  spring 5
  claw 11
  recess 9
    flat surface 10
  flange 21
alignment tube 13
  internal surface (has a shape conjugated to the shape of the assembly comprising the groove 6 and the lip 8)
  hollow end

The invention claimed is:

1. A contacting element for a connector for optical fibers, comprising a front part, within which a ferrule is lodged and fixed, a rear part within which a spring is lodged, and an alignment tube, the rear part being formed to allow the through-passage of an optical fiber, the front part being movably fixed to the rear part, the front part adapted to be inserted at least partially within the rear part so that the spring pushes the front part and the rear part in opposite directions, the front part being provided with a locking portion formed so as to allow coupling in a fixed but separable position with an end of the alignment tube, wherein said locking portion comprises a groove or protuberance extending around the circumference of said front part, interrupted by at least one longitudinal slot.

2. The contacting element of claim 1, wherein said groove is adjacent to a lip, said lip protruding with respect to said groove.

3. The contacting element of claim 1, wherein said rear part has a recess, the bottom of said recess having at least one anti-rotation surface.

4. The contacting element of claim 1, wherein the front part is at least partially inserted into the rear part, the spring being arranged in the interior of the rear part in compression against a rear end of the front part.

5. The contacting element of claim 4, wherein the rear part comprises at least one claw which cooperates with a gripping shoulder formed in the front part to hold the front part integral with the rear part.

6. A connector for optical fibers, comprising a housing and at least one contacting element mounted in the housing, the contacting element comprising a front part, within which a ferrule is lodged and fixed, a rear part within which a spring is lodged, and an alignment tube, the rear part being formed to allow the through-passage of an optical fiber, the front part being movably fixed to the rear part, the front part adapted to be inserted at least partially within the rear part so that the spring pushes the front part and the rear part in opposite directions, the front part being provided with a locking portion formed so as to allow coupling in a fixed but separable position with an end of the alignment tube, wherein the connector comprises a plurality of said contacting elements and wherein the housing comprises a body supporting the plurality of contacting elements and optionally electrical terminals, and a shell assembled to the body.

7. A connector for optical fibers, comprising a housing and at least one contacting element mounted in the housing, the contacting element comprising a front part, within which a ferrule is lodged and fixed, a rear part within which a spring is lodged, and an alignment tube, the rear part being formed to allow the through-passage of an optical fiber, the front part being movably fixed to the rear part, the front part adapted to be inserted at least partially within the rear part so that the spring pushes the front part and the rear part in opposite directions, the front part being provided with a locking portion formed so as to allow coupling in a fixed but separable position with an end of the alignment tube, wherein the housing comprises a support body comprising at least one lodging cavity supporting and positioning the at least one contacting element in the housing, each lodging cavity comprising a lateral slot allowing lateral insertion of each contacting element into its respective lodging cavity, an anti-rotation guide running along the slot cooperating with an anti-rotation surface of the contacting element in order to block the rotation thereof when it is inserted into the support body.

8. The connector of claim 7, wherein the support body comprises a rail inserted into a recess of the rear part to block the axial position of the rear part with respect to the housing.

* * * * *